(12) United States Patent
Inoue (10) Patent No.: US 7,025,340 B2
(45) Date of Patent: Apr. 11, 2006

(54) FLUID-FILLED VIBRATION DAMPING DEVICE

(75) Inventor: Chiyaki Inoue, Komaki (JP)

(73) Assignee: TOKAI Rubber Industries, Ltd., Aichi-Ken (JP)

( * ) Notice: Subject to any disclaimer, the term of this patent is extended or adjusted under 35 U.S.C. 154(b) by 0 days.

(21) Appl. No.: 10/892,012

(22) Filed: Jul. 14, 2004

(65) Prior Publication Data

US 2005/0035508 A1 Feb. 17, 2005

(30) Foreign Application Priority Data

Aug. 12, 2003 (JP) .............................. 2003-207412

(51) Int. Cl.
*F16F 13/00* (2006.01)
(52) U.S. Cl. ................................. 267/140.13
(58) Field of Classification Search .......... 267/140.13, 267/140.14, 140.15, 141, 141.2, 141.4, 141.6; 248/562, 636
See application file for complete search history.

(56) References Cited

U.S. PATENT DOCUMENTS 6,357,731 B1 * 3/2002 Tanahashi .............. 267/140.13

| | | | |
|---|---|---|---|
| 2001/0004141 A1 | 6/2001 | Shimoda et al. | ....... 267/140.13 |
| 2002/0140144 A1 * | 10/2002 | Hibi et al. | ............. 267/140.13 |
| 2003/0205856 A1 * | 11/2003 | Hibi et al. | ............. 267/140.13 |
| 2004/0119215 A1 | 6/2004 | Nanno et al. | .......... 267/140.13 |

FOREIGN PATENT DOCUMENTS

| JP | 7-243472 | 9/1995 |
|---|---|---|
| JP | 2001-165231 | 6/2001 |

* cited by examiner

*Primary Examiner*—Thomas Williams
(74) *Attorney, Agent, or Firm*—Beyer Weaver & Thomas, LLP (57) ABSTRACT

A fluid-filled vibration damping device includes: an elastic body connecting a first mounting member and a second mounting member; and a partition member assembled with the second mounting member to form on its opposite sides a pressure receiving chamber partially defined by the elastic body and an equilibrium chamber partially defined by a flexible layer, both being filled with non-compressible fluid. The partition member defines an orifice passage connecting the two chambers, and including a first partitioning wall portion partitioning the orifice passage from the pressure-receiving chamber, and a second partitioning wall portion of rubber partitioning the orifice passage from the equilibrium chamber. A partial reinforcing member is provided to the partition member extending across the first and second partitioning wall portions to reinforce an opening of the orifice passage to the pressure-receiving chamber.

6 Claims, 4 Drawing Sheets

FLUID-FILLED VIBRATION DAMPING DEVICE

INCORPORATED BY REFERENCE

The disclosure of Japanese Patent Application No. 2003-207412 filed on Aug. 12, 2003 including the specification, drawings and abstract is incorporated herein by reference in its entirety.

BACKGROUND OF THE INVENTION

1. Field of the Invention

The present invention relates generally to fluid-filled vibration damping devices capable of exhibiting damping effect on the basis of flow action of non-compressible fluid sealed therein, and more particularly to a fluid-filled vibration damping device suitably applicable to engine mounts or other mounts for use in automotive vehicles, for example.

2. Description of the Related Art

Vibration-damping devices, typically including a first and a second mounting member elastically connected via a rubber elastic body, have been widely used in a variety of fields as vibration damping couplings or mounts which are interposed between two members of a vibration system. As one type of such vibration damping devices, there have been proposed a fluid-filled vibration damping device that is of construction further includes: a pressure-receiving chamber whose wall is partially defined by the rubber elastic body and undergoes fluid pressure fluctuation upon application of vibration between the first and second mounting members; an equilibrium chamber whose wall is partially defined by a flexible layer and permits a volumetric change thereof as a result of deformation of the flexible layer; a partition member assembled with the second mounting member so as to form on the opposite sides thereof the pressure-receiving chamber and the equilibrium chamber each having non-compressible fluid sealed therein; and an orifice passage for permitting a fluid communication between the pressure receiving chamber and the equilibrium chamber. Typical examples of such a fluid-filled vibration-damping device are disclosed in JP-A-7-243472 and JP-A-2001-165231, for example.

The fluid-filled vibration damping device of this construction is capable of exhibiting vibration damping effect on the basis of resonance or other flow action of the non-compressible fluid sealed therein, thereby readily affording low dynamic spring action and high attenuation action in the tuning frequency range at levels not achieved simply by damping action of a rubber elastic body. For this advantage, the fluid-filled vibration-damping device has been studied to apply to automotive vibration damping devices in which high levels of damping performance are required in certain specific frequency ranges.

Extensive researches conducted by the inventor has revealed that the fluid filled vibration damping device of conventional design may suffer from noises or vibrations induced therein when an impulsively large vibrational load is applied between the first and second mounting members.

SUMMARY OF THE INVENTION

It is therefore one object of this invention to provide a fluid-filled vibration damping device that is novel in construction and capable of preventing or minimizing generation of noises or vibrations when subjected to an impulsive and tremendous vibration or load, while effectively providing its damping performance on the basis of flow action of non-compressible fluid sealed therein.

As a result of further extensive study and analysis conducted by the inventor on phenomena of generation of noises or vibrations in the conventional fluid-filled vibration damping devices, it was revealed that when an impulsively large vibrational load is applied between the first and second mounting members, a large negative pressure induced in the pressure receiving chamber, causing dissolved air present in the non-compressible fluid to separate and form air bubbles, and leading to an explode-wide micro jet created within the pressure receiving chamber as the air bubbles disappear. The pressure or impact of the micro jet is exerted onto the first and second mounting members, thereby generating noises and vibrations as stated above. This is the mechanism of generation of noises and vibrations, found by the inventor.

As a result of further detail inspection conducted by the inventor, it was revealed that these bubbles are generated at around a specific position within the pressure-receiving chamber, more specifically at around an opening of the orifice passage to the pressure-receiving chamber. The present invention has been developed in view of this finding. While the reasons for creation of air bubbles in the pressure receiving chamber has not yet been sufficiently apparent, the inventor considered that these bubbles may be induced due to a basic reason of phase difference between one fluid pressure fluctuation applied to the pressure receiving chamber owing to resonance action of the fluid flowing through the pressure receiving chamber, and the other fluid pressure fluctuation induced in the pressure receiving chamber during input of vibration between the first and second mounting member, and may further be induced as a result of a so-called "liquid breakage phenomenon" that is caused by a relatively large decompression induced at around the opening of the orifice passage to the pressure receiving chamber under suitable conditions of the sealed fluid in terms of a degree of decompression, a temperature, a flowing state, a surface tension, a viscosity and the like.

A first mode of the present invention provides a fluid-filled vibration damping device comprising: a first mounting member; a second mounting member; a rubber elastic body elastically connecting the first and second mounting members, and partially defining a pressure-receiving chamber filled with a non-compressible fluid whose pressure is fluctuated upon application of vibration between the first and second mounting members; a flexible layer partially defining an equilibrium chamber filled with the non-compressible fluid and whose volume is changed due to deformation of the flexible layer; a partition member assembled with the second mounting member so as to form on the opposite sides thereof the pressure-receiving chamber and the equilibrium chamber, said partition member defining an orifice passage that is partitioned from the pressure-receiving chamber and the equilibrium chamber and permits a fluid communication between the pressure-receiving chamber and the equilibrium chamber, and including a first partitioning wall portion adapted to partition the orifice passage from the pressure-receiving chamber, and a second partitioning wall portion formed of a rubber elastic body and adapted to partition the orifice passage from the equilibrium chamber; and a partial reinforcing member provided to the partition member such that the partial reinforcing member extends across the first and second partitioning wall portions so as to reinforce a first opening of the orifice passage opening to the pressure receiving chamber.

In the fluid-filled vibration damping device of construction according to this mode, the partition member defines the orifice passage to be partitioned from the pressure-receiving chamber and the equilibrium chamber, and the second partitioning wall portion partitioning orifice passage from the equilibrium chamber is formed of the rubber elastic body. This arrangement makes it possible to eliminate or minimize creation of air bubbles at around the first opening of the orifice passage opening to the pressure-receiving chamber.

That is, the creation of air bubbles at around the first opening of the orifice passage, which opens to the pressure-receiving chamber, is caused by a negative pressure generated in the pressure-receiving chamber during input of impulsively large vibrational load between the first and second mounting members. As one way to prevent generation of negative pressure in the equilibrium chamber, it is considered to make a wall spring stiffness of the pressure-receiving chamber small. However, if the wall spring stiffness of the pressure receiving chamber is made small, it is accordingly reduced the fluid pressure fluctuation generated in the pressure-receiving chamber during input of vibration between the first and second mounting members. This inevitably results in deterioration of vibration damping effect with the help of resonance of the fluid flowing through the orifice passage.

In view of the above described drawback, the fluid-filled vibration damping device of the first mode employs the second partitioning wall portion formed of the rubber elastic body, which partitions the orifice passage from the equilibrium chamber, and the partial reinforcing member provided in the partition member for reinforcing the first opening of the orifice passage opening to the pressure receiving chamber. With this arrangement, the present fluid-filled vibration-damping device is capable of generating a sufficient fluid pressure fluctuation in the pressure-receiving chamber during input of vibration in order to maintain an intended vibration damping effect on the basis of flow action of the fluid, while avoiding or minimizing generation of excessively large fluid pressure fluctuation enough to cause the "liquid breakage phenomenon" so that noises or vibrations caused by the excessively large fluid pressure fluctuation in the pressure receiving chamber can be minimized or eliminated.

More specifically, in the fluid-filled vibration damping device of this mode, the partition member is provided with the partial reinforcing member adapted to reinforce the first opening of the orifice passage opening to the pressure-receiving chamber. Therefore, effectively reinforced by means of the partial reinforcing member are the first opening of the orifice passage and the vicinity thereof, which are subjected to considerably large fluid pressure caused by phase difference between the fluid pressure fluctuation generated in the pressure receiving chamber and the flow of the fluid through the orifice passage. This arrangement makes it possible for the fluid-filled vibration damping device of this mode to provide sufficient wall spring stiffness of the pressure-receiving chamber, as well as sufficient fluid pressure fluctuation in the pressure-receiving chamber during input of vibration, thereby ensuring a sufficient amount of fluid flow through the orifice passage generated based on the fluid pressure fluctuation between the pressure-receiving chamber and the equilibrium chamber relative to each other. Thus, the fluid-filled vibration-damping device of construction according to the first mode is capable of exhibiting excellent vibration damping effect on the basis of flow action of the fluid sealed therein.

Moreover, the second partitioning wall portion is at least partially formed of the rubber elastic body, except a portion that defines the first opening of the orifice passage to the pressure-receiving chamber. Therefore, if considerably large fluid pressure is generated at around the first opening of the orifice passage due to phase difference between the fluid pressure fluctuation generated in the pressure receiving chamber and the flow of the fluid through the orifice passage, such a large fluid pressure is quickly absorbed or moderated by the elastic deformation of the second partitioning wall portion situated in the vicinity of the first opening of the orifice passage. Accordingly, excessively large fluid pressure fluctuation generated locally i.e., in the vicinity of the first opening of the orifice passage opening to the pressure-receiving chamber, will be absorbed or moderated by means of the elastic deformation of the rubber elastic body, thus making it possible to eliminate or minimize noises or vibrations due to air bubbles crated in accordance with excessively large fluid pressure fluctuation.

A second mode of the present invention is a fluid-filled vibration damping device according to first mode, wherein the orifice passage circumferentially extends in an outer circumferential portion of the partition member with a circumferential length that is slightly smaller than that of a circumference of the partition member, and one of circumferentially opposite ends of the orifice passage is connected to the pressure-receiving chamber through a pressure-receiving-chamber-side communication hole, while an other one of circumferentially opposite ends of the orifice passage is connected to the equilibrium chamber through an equilibrium-chamber-side communication hole, wherein the partition member is formed with a partition wall formed of a rubber elastic body and adapted to partition the circumferentially opposite ends of the orifice passage from each other, and wherein the partial reinforcing member extends in the circumferential direction to a portion where the partition wall is formed so that deformation of the partition wall is restricted by means of the partial reinforcing member.

In the fluid-filled vibration damping device of construction according to this mode, restricted by the reinforcing member is the elastic deformation of the partition wall partitioning the circumferentially opposite ends of the orifice defining member, making it possible to effectively preventing elastic deformation of the partition wall due to considerably large fluid pressure exerted thereon, which is caused by fluid pressure difference between the pressure-receiving-side communication hole and the equilibrium-chamber-side communication hole. This arrangement prevents a short of the orifice passage due to elastic deformation of the partitioning wall, thereby ensuring vibration damping effect with the help of resonance of the fluid flowing through the orifice passage with enhanced stability. Additional advantage is that this mode makes it possible to restrict elastic deformation of the partition wall without requiring an additional part or member especially to do so, thereby enhancing vibration damping performance of the fluid-filled vibration damping device with simple construction.

A third mode of the present invention provides a fluid-filled vibration damping device according to the above-mentioned first or second mode, wherein a movable rubber plate is provided at a central portion of the partition member such that a fluid pressure of the pressure-receiving chamber is exerted on one of opposite major surfaces of the movable rubber plate, while a fluid pressure of the equilibrium chamber is exerted on an other one of opposite major surfaces of the movable rubber plate.

According to this mode of the invention, the movable rubber plate undergoes its elastic deformation on the basis of pressure difference between the pressure-receiving chamber and the equilibrium chamber. Therefore, when the fluid-filled vibration-damping device of this mode is subjected to input vibration of frequency higher than a tuning frequency of the orifice passage, the fluid pressure fluctuation induced in the pressure-receiving chamber is effectively absorbed or moderated. Thus, the fluid-filled vibration-damping device of this mode is capable of exhibiting enhanced vibration damping performance over a wide frequency range, with the help of damping effect by means of elastic deformation of the movable rubber plate as well as the orifice passage.

A fourth mode of the invention provides a fluid-filled vibration-damping device according to any one of the above-mentioned first to third modes, wherein the second mounting member has an approximately cylindrical configuration, and one of opposite open-end portions of the second mounting member is fluid-tightly closed by the rubber elastic body elastically connecting the second mounting member and the first mounting member disposed on a side of the one of opposite open-end portions with a distance therebetween, while the partition member is formed of the rubber elastic body and disposed within the second mounting member so as to extend in an axis-perpendicular direction of the second mounting member, and a support member is provided at least at an outer circumferential portion of the partition member so as to extend continuously over an entire circumference of the partition member, the support member being bonded at an outer rim portion thereof to the second mounting member and reinforcing the first partitioning wall portion, while being integrally formed with the partially reinforcing member.

In the fluid-filled vibration damping device of construction according to this mode, the support member reinforces the outer circumferential portion of the partition member, while having the partition member firmly fixed to and supported by the second mounting member. This arrangement further effectively induces flow of the fluid through the orifice passage due to fluid pressure fluctuation in the pressure-receiving chamber during input of vibration, and assures further improved vibration damping performance on the basis of fluid flow action. Additionally, the partition member is formed as a part of the support member, leading to advantages of the small number of components as well as easy manufacture.

A fifth mode of the invention provides a fluid-filled vibration-damping device according to the above-mentioned fourth mode, wherein the support member is of generally annular configuration having a center bore and is provided with a reinforcing rib at an inner circumferential edge portion thereof, and the center bore of the support member is fluid-tightly closed by a rubber plate having a given thickness so as to provide the movable rubber plate that is exerted at the one of opposite surfaces thereof to the fluid pressure in the pressure receiving chamber, and at the other of opposite surfaces thereof to the fluid pressure in the equilibrium chamber.

In the fluid-filled vibration damping device according to this mode, the reinforcing rib of the support member provides an effective bonding area with respect to the movable rubber plate, thereby improving durability of the movable rubber plate and other components.

BRIEF DESCRIPTION OF THE DRAWINGS

The forgoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
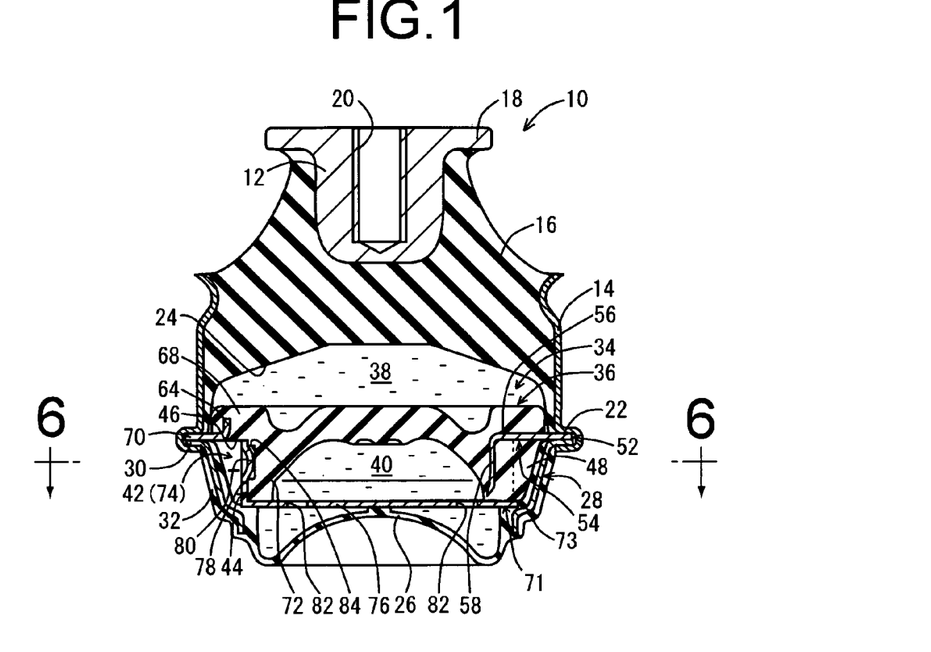
FIG. 1 is an elevational view in axial or vertical cross section of a fluid-filled vibration-damping device in the form of an engine mount of construction according to a first embodiment of the invention, corresponding to a view in vertical cross section taken along line 1—1 of FIG. 3.
Figure 2:
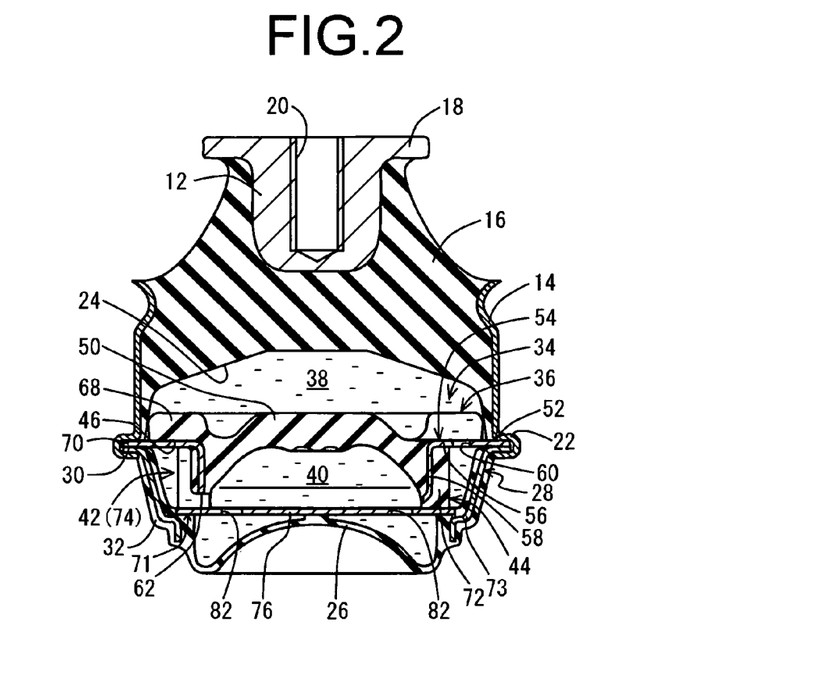
FIG. 2 is an elevational view in axial or vertical cross section of the engine mount of FIG. 1 corresponding to a view in vertical cross section taken along line 2—2 of FIG. 3.

Referring first to FIG. 1, there is shown a fluid-filled vibration-damping device in the form of an engine mount 10 for use in automotive vehicles, which is constructed according to a first embodiment of the invention. The engine mount 10 is of structure having a first mounting member 12 of metal, a second mounting member 14 of metal and a rubber elastic body 16 by which the first and second mounting members are elastically connected with each other. The first mounting member 12 is mounted on a power unit side, while the second mounting member 14 is mounted on a body side of an automotive vehicle, so that the power unit is mounted on the body of the vehicle in a vibration damping fashion, via the engine mount 10. In the following description, the vertical direction will be basically used to refer to the vertical direction as seen in FIGS. 1 and 2, or approximately the vertical direction of the engine mount 10 installed on the vehicle as described above in which a vibrational load is primarily applied to the engine mount 10.

Described more specifically, the first mounting member 12 has an approximately solid cylindrical block shape provided with a flange portion 18 integrally formed at its upper end portion in the axial direction, while extending diametrically outwardly. The first mounting member 12 is also provided with a tapped hole 20 open in an upper end face thereof and extending downward along a center axis thereof with a given axial direction. By means of a fastening bolt threaded into the tapped hole 20, the first mounting member 12 is fixed to the power unit (not shown) of the vehicle.

The second mounting member 14 has a large-diameter generally cylindrical configuration, and is formed with a caulking portion 22 extending diametrically outward at a lower open-end portion in the axial direction thereof. The first mounting member 12 is disposed above and away from the second mounting member 14 in the axial direction in an approximately coaxial fashion. The first and second mounting members 12, 14 are elastically connected with each other via the rubber elastic body 16.

The rubber elastic body 16 has an approximately truncated conical configuration in its entirety, and is formed with a large-diameter recess 24 open in its large-diameter end face. During vulcanization of a rubber material for forming the rubber elastic body 16, the rubber elastic body 16 is bonded at its small-diameter end face to the first mounting member 12, while being bonded at an outer circumferential surface of its large-diameter end portion to the second mounting member 14. Namely, the rubber elastic body 16 provides an integrally vulcanized product including the first mounting member 12 and the second mounting member 14. With this arrangement, the first mounting member extends into the rubber elastic body 16 from the small-diameter end face, whereby the substantially entire area, except an upper axial end face, of the first mounting member 12 is coated by the rubber elastic body 16. On the other hand, the second mounting member 14 is disposed about and bonded onto the large-diameter end portion of the rubber elastic body 16, over its substantially entire inner surface area, except the caulking portion 22.

A flexible layer in the form of a flexible diaphragm 26 is disposed at the lower open-end portion of the second mounting member 14 in the axial direction, so as to fluid-tightly close the lower open-end portion. The flexible diaphragm 26 is a thin rubber layer of canopy like shape, having a slack enough to facilitate its elastic deformation. To the periphery of the flexible diaphragm 26, is bonded a fixing metal 28 of approximately cylindrical configuration. Namely, the periphery of the flexible diaphragm 26 is bonded to an axially lower edge portion of the fixing metal 28 through vulcanization of a rubber material for forming the flexible diaphragm 26. To an axially upper edge portion of the fixing metal 28, on the other hand, a fixing flange portion 30 extending diametrically outward is integrally formed. The fixing flange portion 30 is superimposed against the caulking portion 22 provided at the lower open-end portion of the second mounting member 14, and is fixed by caulking to the second mounting member 14 in a fluid-tight fashion. In the present embodiment, inner and outer circumferential surfaces of the fixing metal 28 are substantially entirely coated by a thin coating rubber layer 32 integrally formed with the flexible diaphragm 28.

As illustrated above, the second mounting member 14 is fluid-tightly closed at its upper open-end portion by means of the rubber elastic body 16, and at its lower open-end portion by means of the flexible diaphragm 18, thereby defining between the rubber elastic body 16 and the flexible diaphragm 26 a fluid sealing area 34 sealed off from the external area. This fluid sealing area 34 is filled with a non-compressible fluid. For effective damping of input vibration based on resonance of the fluid flowing through an orifice passage 42, which will be described later, it is preferable to employ a low-viscosity fluid whose viscosity is not higher than 0.1 Pa.s, such as water, alkylene glycol, polyalkylene glycol and silicone oil.

The fluid sealing area 34 houses a partition member 36 disposed therein. The partition member 36 partitions the fluid sealing area 34 into a pressure receiving chamber 38 and an equilibrium chamber 40. The pressure-receiving chamber 38 is partially defined by the rubber elastic body 16 so as to undergo fluctuation in internal pressure on the basis of elastic deformation of the rubber elastic body 16 during vibration input. The equilibrium chamber 40, on the other hand, is partially defined by the flexible diaphragm 26 so as to readily permit change in volume based on elastic deformation of the diaphragm 40, thereby canceling fluid pressure fluctuation quickly. The orifice passage 42 is formed at an outer circumferential portion of the partition member 36. Through the orifice passage 42, the pressure-receiving chamber 38 and the equilibrium chamber 40 are held in fluid communication with each other.

The partition member 36 is of thick disk-like configuration in its entirety, and is formed of a rubber elastic body. The thickness dimension of the partition member 36 is especially made large at its outer circumferential portion so as to provide an orifice defining portion 44 of annular block configuration continuously extending with an approximately constant cross sectional shape all the way around its circumference. At a lower end peripheral edge portion of the partition member 36, there is formed a circumferential groove 46 circumferentially extending with a constant inverted L shape in cross section, over a circumferential length slightly smaller than a circumference of the partition member 36. In other words, the circumferential groove 46 is blocked by means of a partition wall 48 formed at a circumferential position thereof so that a pair of circumferentially opposite ends of the circumferential groove 46 are opposed to each other with the partition wall 48 interposed therebetween in the circumferential direction.

The central portion of the partition member 36 serves as a movable rubber plate 50. The movable rubber plate 50 is of a disk-shape configuration having a given thickness. The peripheral portion of the movable rubber plate 50 extends downwards to form an inclined fringe, whereby the movable rubber plate 50 has an inverted dish-like configuration, where a central portion thereof projects upward slightly. This movable rubber plate 50 is disposed in a center bore of the orifice defining portion 44, while extending in an axis perpendicular direction and being integrally bonded at its inclined fringe to an axially medial portion of an inner circumferential surface of the orifice defining portion 44 of the partition metal 38, through vulcanization of a rubber material for forming the movable rubber plate 50, whereby providing the partition member 36 formed as an integral vulcanization product including the movable rubber plate 50 and the orifice defining portion 44. With this arrangement, a center bore of the orifice defining portion 44 is fluid-tightly closed.

Figure 3:
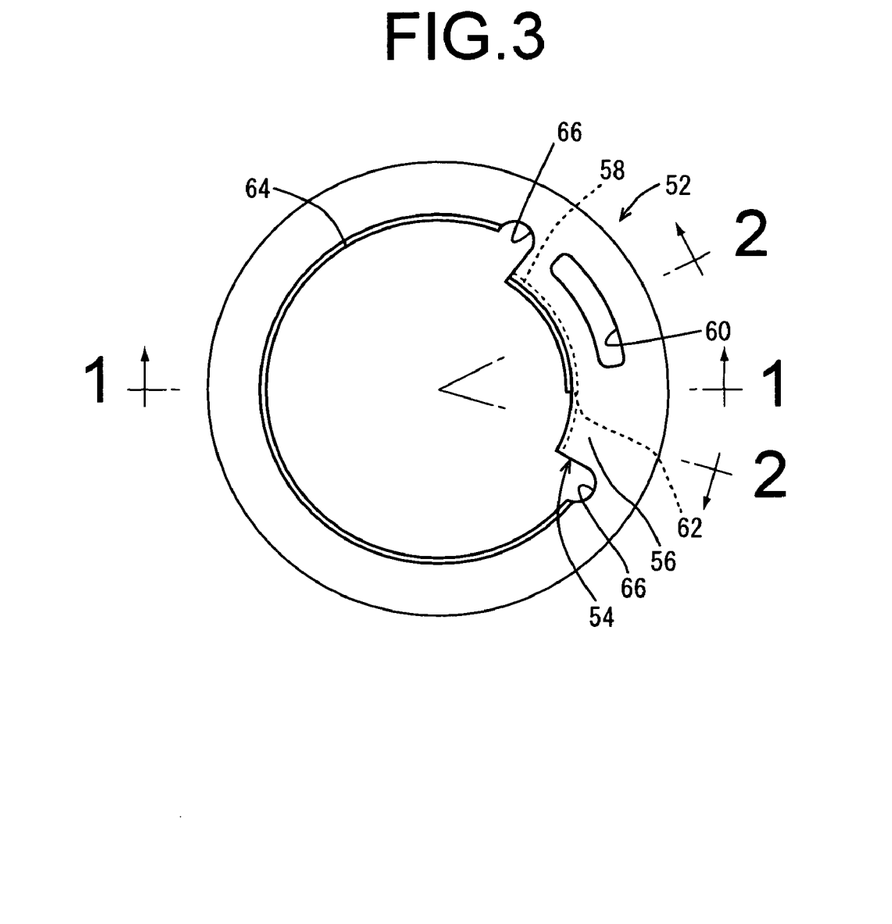
FIG. 3 is a top plane view of a partition member of the engine mount of FIG. 1.
Figure 4:
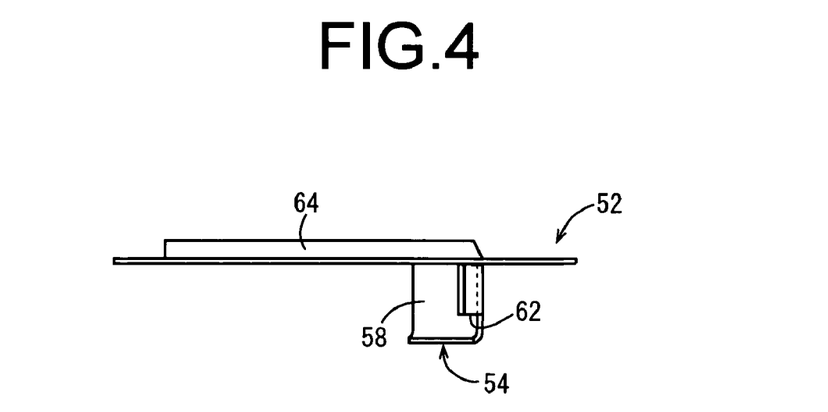
FIG. 4 is a front elevational view of the partition member of FIG. 3.
Figure 5:
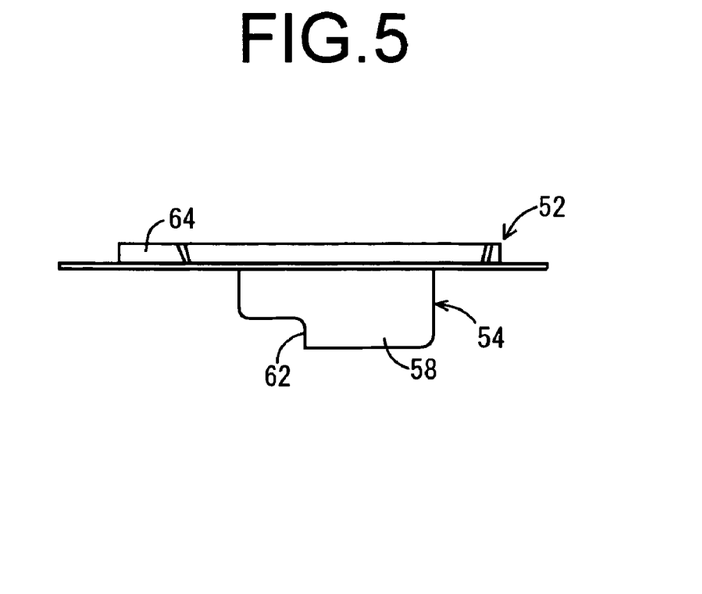
FIG. 5 is a right side elevational view of the partition member of FIG. 3.

A support member 52 is fixed to the partition member 36. Referring to FIGS. 3 to 5 showing solely the support member 52, the support member 52 is of thin annular plate shape overall, and has a reinforcing portion 54 situated at a given circumferential position and extending radially inwardly. The reinforcing portion 54 has a circumferential length of about one third of the circumference of the support member 52, and consists of a widthwise plate portion 56 extending in a direction perpendicular to the axis direction of the reinforcing portion 54, and a lengthwise plate portion 58 extending vertically downward in the axis direction, which is formed by bending inner peripheral portion of the widthwise plate portion 56 vertically downwardly. The widthwise plate portion 56 is perforated through its thickness by a communication hole 60 at a location close to one circumferential end portion thereof. The lengthwise plate portion 58, on the other hand, has a lower edge portion slightly inwardly curled so as to be reinforced, and is formed with a communication window 62 of cutout shape at a location close to one circumferential end portion thereof.

The support member 52 further includes a reinforcing rib 64 integrally formed at an inner circumferential portion thereof extending over a circumferential length of about two thirds of the circumference thereof, except an area where the reinforcing portion 54 is formed. The reinforcing rib 64 projects upwardly while curving radially outwardly to have a curl-like configuration. In order to facilitate the formation of the reinforcing rib 64, a pair of separation voids 66, 66 of arcuate cutout shape are formed at portions adjacent to circumferentially opposite ends of the reinforcing portion 54.

As shown in FIGS. 1 and 2, the support member 52 of construction as stated above is bonded to the partition member 36 through the vulcanization, with a portion thereof being embedded within the orifice-defining portion 44 of the partition member 36. That is, the partition member 36 is formed as an integral vulcanization molded product having the support member 52.

This support member 52 is affixed to a first partitioning wall portion 68 situated on the side of the pressure-receiving chamber, which is constituted by an upper wall portion of the circumferential groove 46 of the orifice defining portion 44. With this state, an outer rim portion of the support member 52 projects radially outward from the partition member 36 all the way around the circumference thereof. This projected outer rim portion of the support member 52 serves as a fixing portion 70. On the other hand, an inner rim portion of the support member 52 is superimposed onto and bonded to the lower face of the first partition wall portion 68. In other words, the upper face of the support member 52 is substantially entirely coated by a rubber elastic body of the partition member 36 having a given thickness. The support member 52 may be disposed extending across an entire width dimension of the circumferential groove 46, or alternatively may be disposed bonded to the first partition wall portion 68 with a radial dimension not enough to cover the entire width dimension of the circumferential groove 46.

The reinforcing portion 54 of the support member 52 is bonded to the first partitioning wall portion 68 with the widthwise plate portion 56 covering the circumferential groove 46 across the entire widthwise dimension of the circumferential groove 46. In the present embodiment, the first partitioning wall portion 68 is not formed at a location where the communication hole 60 is formed, so that the widthwise plate portion 56 is exposed to the pressure receiving chamber 38. With this arrangement, the first partitioning wall portion 68 is interrupted in the circumferential direction at a location where the communication hole 60 is formed. On the other hand, the lengthwise plate portion 58 is bonded in an embedded manner to a second partitioning wall portion 72 situated on the side of the pressure-receiving chamber 40, which is an inner circumferential wall portion of the circumferential groove 46 of the orifice defining portion 44. The lower end of the lengthwise plate portion 58 is extends downwardly with a length that is slightly insufficient to reach the bottom of the second partitioning wall portion 72, whereby the lower end of the lengthwise plate portion 58 is coated by a rubber elastic body that constitutes the second partitioning wall portion 72.

Figure 6:
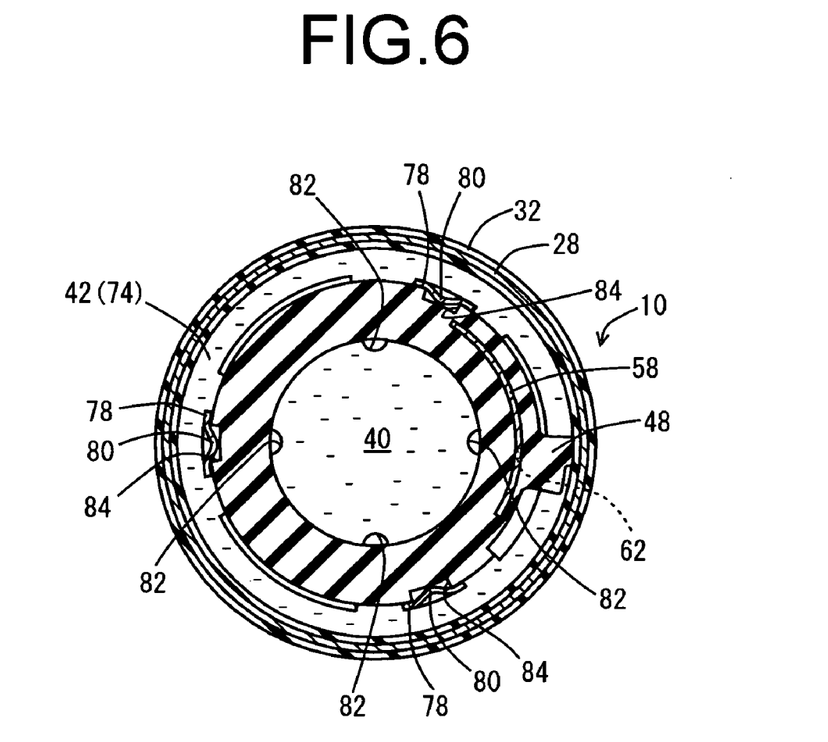
FIG. 6 is a cross sectional view taken along line 6—6 of FIG. 1.

The support member 52 is positioned relative to the partition member 36 in the circumferential direction by situating the reinforcing portion 54 onto a portion where the partition wall 48 is formed (see FIG. 6). With this arrangement, the upper portion as well as the inner circumferential portion of the partition wall 48 is reinforced by means of the support member 52 continuously over the entire area.

The communication hole 60 of the reinforcing portion 54 is situated to a first circumferential end of the circumferential groove 46 of the partition member 36, so that the first circumferential end of the circumferential groove 46 is open to the upper side of the partition member 36 through the communication hole 60. The communication window 62, on the other hand, is situated to the other circumferential end of the circumferential groove 46 of the partition member 36, so that the other circumferential end of the circumferential groove 46 is open to the radially inner side of the partition member 36 through the communication window 62.

The partition member 36 of construction as stated above is housed within the fluid sealing area 34, and situated at the lower open end portion of the second mounting member 14, while extending in an axis-perpendicular direction of the second mounting member 14. The outer rim portion of the support member 52 bonded through vulcanization to the partition member 36, i.e., the fixing portion 70 is superimposed onto the caulking portion 22 of the second mounting member 14, and then is fixed caulkwise to the lower open end portion of the second mounting member 14 in a fluid-tight fashion, together with the fixing flange portion 30 of the fixing metal 28, by pressingly bending the caulking portion 22 of the second mounting member 14 against the outer rim portion of the support member 52 and the fixing flange portion 30 in the process of caulking fixation. With the partition member 36 fixed caulkwise to the lower open end portion of the second mounting member 14, the lower end of the orifice defining portion 44, i.e., the lower end of the second partition wall portion 72 is superimposed onto a shoulder portion 73 formed at an axially medial portion of the fixing metal 28. With this regards, a part of the coating rubber layer 32, which part is adhered to the inner circumferential surface of the fixing metal 28 is made thick at a portion around the shoulder portion 73, thereby providing an annular superimposing face 71. Against this annular superimposing face 71, the lower end of the second partition wall portion 72 is superimposed, whereby the inner circumferential side and the outer circumferential side of the second partitioning wall portion 72 are separated from each other in a fluid-tight fashion. Also, with the fixing portion 70 fixed caulkwise to the lower open end portion of the second mounting member 14, the upper side and the lower side of the first partitioning wall portion 68 are separated from each other in a fluid tight fashion.

In the outer circumferential portion of the fluid-sealing area 34, there is formed an annular region 74 between the orifice defining portion 44 and the fixing metal 28. This annular region 74 is blocked at one circumferential position thereof in a fluid-sealing fashion, so that the annular region 74 extends in the circumferential direction with a circumferential length slightly smaller than the entire circumference thereof, while maintaining a substantially constant cross sectional shape over the entire circumferential length. A first circumferential end of the annular region 74 is held in fluid communication with the pressure-receiving chamber 38 through the communication hole 60, while the other end of the annular region 74 is held in fluid communication with the equilibrium chamber 40 through the communication window 62, whereby is formed an orifice passage 42 for permitting a fluid communication between the pressure-receiving chamber 38 and the equilibrium chamber 40.

The movable rubber plate 50 is disposed within the fluid sealing area 34 so as to extend in the axis perpendicular direction of the second mounting member 14, and is therefore subjected at its upper face to the fluid pressure in the pressure-receiving chamber 38, and at its lower face to the fluid pressure in the equilibrium chamber 40.

Figure 7:
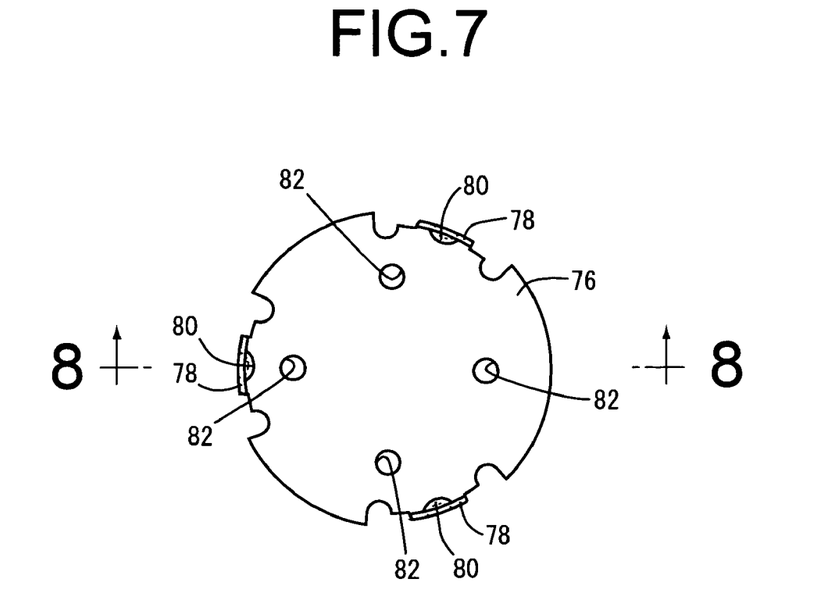
FIG. 7 is a top plane view of a plate member of the engine mount of FIG. 1.
Figure 8:
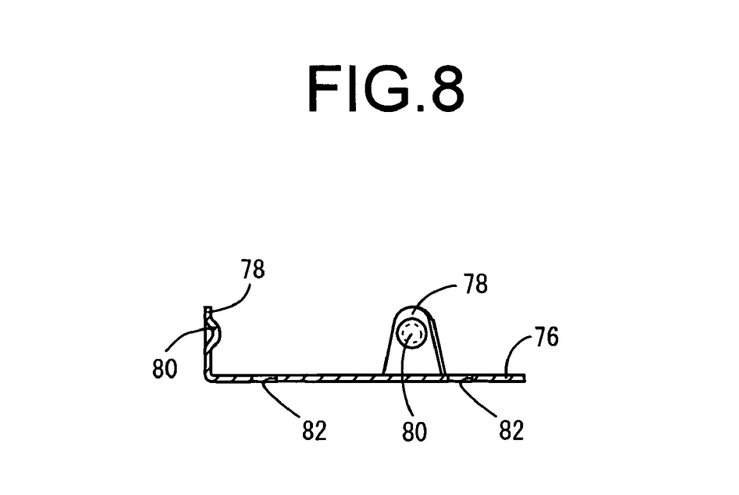
FIG. 8 is a cross sectional view taken along line 8—8 of FIG. 7.

Further, a metallic plate 76 is superimposed onto the lower face of the partition member 36 in the present embodiment. Referring to FIGS. 7 and 8 solely shown is the metallic plate 76 of thin-disk configuration overall. The metallic plate 76 includes the suitable number of engaging jaws 78 integrally formed at respective circumferential positions on its outer rim portion so as to project upwardly. Each of the engaging jaws 78 includes an engaging projection 80. The metallic plate 76 is perforated through its thickness at its central portion by a plurality of through holes 82. The metallic plate 76 of construction stated above is forcedly sandwiched between the lower end face of the partition member 36 and the shoulder portion 73 of the fixing metal 28, with the engaging projections 80 formed at the engaging jaws 78 mated with engaging recesses 84 formed onto and open in an outer circumferential surface of the second partitioning wall portion 72 of the partition member 36. With this state, the metallic plate 78 is assembled with the second mounting member 14.

With the metallic plate 76 assembled with the second mounting member 14 as stated above, the metallic plate 76 extends in the axis-perpendicular direction of the second mounting member 14, while being disposed between the movable rubber plate 50 and the diaphragm 26 with a spacing therebetween. With this arrangement, the metallic plate 76 partitions the equilibrium chamber 70 into sections located on the upper and lower sides thereof, which are mutually held in fluid communication through the through holes 82. The orifice passage 42 may be open to either side of the metallic plate. In the present embodiment, the orifice passage 42 is open to the side of the movable rubber plate 50.

As will be understood from the forgoing description, the reinforcing portion 54, in the present embodiment, constitutes a partial reinforcing member, and the communication hole 60 constitutes a pressure-receiving chamber side communication hole, while the communication window 62 constitutes an equilibrium chamber side communication hole.

The engine mount 10 of construction as stated above is installed between the power unit and the body of the vehicle, with the first mounting member fixed to the power unit side by means of a fixing bolt threaded into the tapped hole 20, and with the second mounting member fixed to the body side via a bracket or another fixing member. With the engine mount 10 installed in position as described above, when a vibrational load is applied between the first and second mounting members 12, 14, flows of the fluid through the orifice passage 42 is caused due to a relative pressure fluctuation between the pressure receiving chamber 38 and the equilibrium chamber 40, whereby the engine mount 10 can exhibit excellent vibration damping effect on the basis of resonance of the fluid flowing through the orifice passage 42. A ratio of a cross sectional area to a length of the orifice passage 42 is suitably adjusted so that the engine mount 10 exhibits desired damping effect on the basis of the resonance of the fluid with respect to a desired frequency band. For instance, the orifice passage 42 may be adjusted so that the engine mount 10 can exhibit effective damping performance with respect to engine shakes or other low frequency vibrations that may be occurred during driving of the vehicle.

Moreover, the pressure receiving chamber 38 and the equilibrium chamber 40 are both partially defined by the movable rubber plate 50. With this arrangement, if the input vibrational load has a frequency higher than the frequency to which the orifice passage 42 is tuned, the movable rubber plate 50 undergoes slight elastic displacement, thus making it possible to absorb or minimize fluid pressure variation occurred in the pressure-receiving chamber 38 by means of the slight elastic displacement of the movable rubber plate 50. Accordingly, the engine mount 10 of the present embodiment can also prevent significant increase in the dynamic spring constant thereof, and exhibit a high damping effect, when subjected to a booming noise or other vibrations extending over an intermediate and a high frequency band, which may occurred during idling or driving of the vehicle.

It should be appreciated in the present embodiment that the presence of the through holes 82 formed through the metallic plate 76 disposed within and partitioning the equilibrium chamber 82 makes it possible to more precisely tune the damping effect on the basis of the elastic deformation of the movable rubber plate 50 to a desired frequency range.

According to the present embodiment, the communication hole 60 and the vicinity thereof are provided with a great rigidity by means of the reinforcing portion 54, thereby effectively ensuring a desired rigidity of a wall of the pressure-receiving chamber 38, so that the pressure-receiving chamber 38 undergoes sufficient fluid pressure fluctuation during input of vibration between the first and second mounting members. This arrangement ensures a sufficient amount of fluid flowing through the orifice passage 42 due to the fluid pressure fluctuation between the pressure-receiving chamber 38 and the equilibrium chamber 40, resulting in sufficient vibration damping effect on the basis of flow action of the fluid.

Further, the second partitioning wall portion 72 is reinforced by means of the lengthwise plate portion 58 at a first portion where is located in the vicinity of the communication hole 60, and is formed of a rubber elastic body at the other portion except the first portion. With this arrangement, if a relatively large fluid pressure induced in the vicinity of the communication hole 60 due to the phase difference between the fluid pressure fluctuation in the pressure receiving chamber 38 and the fluid flow through the orifice passage 42, the induced relatively large fluid pressure will be quickly absorbed or moderated based on the elastic deformation of the second partitioning wall portion 72 situated in the vicinity of the communication hole 60.

Therefore, the engine mount 10 of construction according to the present embodiment effectively permits the fluid pressure fluctuation in the pressure receiving chamber 38 during input of vibration so as to provide a desired vibration damping effect on the basis of fluid flow action, while preventing or moderating excess fluid pressure fluctuation in the pressure receiving chamber 38, which is large enough to cause a so-called "fluid breakage phenomenon" wherein dissolved air present in the non-compressible fluid to separate and form air bubbles, thereby preventing or minimizing generation of noises or vibrations caused by appearance and disappearance of the bubbles.

Additionally, the partition wall 48 is continuously reinforced at its upper portion and the inner circumferential portion by means of the reinforcing portion 54, thereby effectively preventing deformation of the partition wall 48, and accordingly preventing a short of the orifice passage 42 due to elastic deformation of the partition wall 48. Thus, the engine mount 10 of this embodiment is able to exhibit vibration-damping effect on the basis of the resonance of the fluid flowing through the orifice passage 42 with further improved stability.

Furthermore, the reinforcing rib 64 provided to the support member 52 makes it possible for the support member 52 to obtain a sufficient contact area with the first partitioning wall portion 68, thereby assuring durability of the first partitioning wall portion 68.

While the present invention has been described in the presently preferred embodiment in detail, it is to be understood that the invention is not limited to the details of the illustrated embodiment, and that the invention may be otherwise embodied.

For instance, while the first partitioning wall portion 68 is formed of a rubber elastic body in the illustrated embodiment, it may be formed of metal or other rigid materials.

While the orifice passage 42 extends circumferentially with the circumferential length slightly smaller than its entire circumference, the orifice passage 42 may be formed with a desired length such as a half of the circumference, a length longer than the circumference, or other possible length, depending on the required characteristics of the engine mount 10.

Further, the movable rubber plate 50 employed in the illustrated embodiment is not essential to practice the present invention.

Likewise, the metallic plate 76 employed in the illustrated embodiment is not essential to practice the present invention.

While the circumferential groove 46 of cutout shape is formed at the outside edge portion of the lower end of the orifice defining member 44, so as to extend with the circumferential length slightly smaller than that of the circumference of the orifice defining member 44, in the illustrated embodiment, the circumferential groove 46 may have a variety of configuration including a circumferential groove of lateral "U" shape cross sectional shape, which is open in the outer circumferential surface of the orifice defining member 44.

It is also to be understood that the present invention may be embodied with various other changes, modifications and improvements, which may occur to those skilled in the art, without departing from the spirit and scope of the invention defined in the following claims.

What is claimed is:

1. A fluid-filled vibration damping device comprising:
   a first mounting member;
   a second mounting member;
   a rubber elastic body elastically connecting the first and second mounting members, and partially defining a pressure-receiving chamber filled with a non-compressible fluid whose pressure is fluctuated upon application of vibration between the first and second mounting members;
   a flexible layer partially defining an equilibrium chamber filled with the non-compressible fluid and whose volume is changed due to deformation of the flexible layer;
   a partition member assembled with the second mounting member so as to form on the opposite sides thereof the pressure-receiving chamber and the equilibrium chamber, said partition member defining an orifice passage that is partitioned from the pressure-receiving chamber and the equilibrium chamber and permits a fluid communication between the pressure-receiving chamber and the equilibrium chamber, and including a first partitioning wall portion adapted to partition the orifice passage from the pressure-receiving chamber, and a second partitioning wall portion formed of a rubber elastic body and adapted to partition the orifice passage from the equilibrium chamber; and
   a partial reinforcing member provided to the partition member such that the partial reinforcing member extends across the first and second partitioning wall portions so as to reinforce a first opening of the orifice passage opening to the pressure receiving chamber,
   wherein the partial reinforcing member includes a widthwise plate portion affixed to and reinforcing the first partitioning wall portion, and a lengthwise plate portion affixed to and reinforcing the second partitioning wall portion at a portion situated in a vicinity of the first opening of the orifice passage opening to the pressure-receiving chamber, the second partitioning wall portion being elastically deformable at an other portion so as to absorb a relatively large fluid pressure.

2. A fluid-filled vibration-damping device according to claim 1, further comprising a metallic plate superimposed onto an axially lower end face of the partition member so as to partition the equilibrium chamber into sections located on opposite sides thereof, which are mutually held in fluid communication via a through hole formed therethrough.

3. A fluid-filled vibration-damping device according to claim 1, wherein the orifice passage circumferentially extends in an outer circumferential portion of the partition member with a circumferential length that is slightly smaller than that of a circumference of the partition member, and one of circumferentially opposite ends of the orifice passage is connected to the pressure-receiving chamber through a pressure-receiving-chamber-side communication hole, while an other one of circumferentially opposite ends of the orifice passage is connected to the equilibrium chamber through an equilibrium-chamber-side communication hole, wherein the partition member is formed with a partition wall formed of a rubber elastic body and adapted to partition the circumferentially opposite ends of the orifice passage from each other, and wherein the partial reinforcing member extends in the circumferential direction to a portion where the partition wall is formed so that deformation of the partition wall is restricted by means of the partial reinforcing member.

4. A fluid-filled vibration-damping device according to claim 1, wherein a movable rubber plate is provided at a central portion of the partition member such that a fluid pressure of the pressure-receiving chamber is exerted on one of opposite major surfaces of the movable rubber plate, while a fluid pressure of the equilibrium chamber is exerted on an other one of opposite major surfaces of the movable rubber plate.

5. A fluid-filled vibration-damping device according to claim 1, wherein the second mounting member has an approximately cylindrical configuration, and one of opposite open-end portions of the second mounting member is fluid-tightly closed by the rubber elastic body elastically connecting the second mounting member and the first mounting member disposed on a side of the one of opposite open-end portions with a distance therebetween, while the partition member is formed of the rubber elastic body and disposed within the second mounting member so as to extend in an axis-perpendicular direction of the second mounting member, and a support member is provided at least at an outer circumferential portion of the partition member so as to extend continuously over an entire circumference of the partition member, the support member being bonded at an outer rim portion thereof to the second mounting member and reinforcing the first partitioning wall portion, while being integrally formed with the partial reinforcing member.

6. A fluid-filled vibration-damping device according to claim 5, wherein the support member is of generally annular configuration having a center bore and is provided with a reinforcing rim at an inner circumferential edge portion thereof, and the center bore of the support member is fluid-tightly closed by a rubber plate having a given thickness so as to provide the movable rubber plate that is exerted at the one of opposite surfaces thereof to the fluid pressure in the pressure receiving chamber, and at the other of opposite surfaces thereof to the fluid pressure in the equilibrium chamber.

* * * * *